(12) United States Patent
Paraschiv (10) Patent No.: US 7,376,086 B1
(45) Date of Patent: May 20, 2008

(54) CONSTRAINT BASED ROUTING WITH NON-TRANSITIVE EXCEPTIONS

(75) Inventor: Antonela Paraschiv, Burlington, MA (US)

(73) Assignee: Nortel Networks Limited (CA)

( * ) Notice: Subject to any disclaimer, the term of this patent is extended or adjusted under 35 U.S.C. 154(b) by 1085 days.

(21) Appl. No.: 10/241,423

(22) Filed: Sep. 12, 2002

(51) Int. Cl.
  *H04L 12/26* (2006.01)
(52) U.S. Cl. ..................... 370/237; 370/231
(58) Field of Classification Search ............... None
  See application file for complete search history.

(56) References Cited

U.S. PATENT DOCUMENTS

| | | | |
|---|---|---|---|
| 6,600,724 B1 * | 7/2003 | Cheng | 370/256 |
| 6,606,303 B1 * | 8/2003 | Hassel et al. | 370/238 |
| 6,829,347 B1 * | 12/2004 | Odiaka | 379/220.01 |
| 6,956,821 B2 * | 10/2005 | Szviatovszki et al. | 370/237 |
| 7,082,102 B1 * | 7/2006 | Wright | 370/229 |
| 2004/0004939 A1 * | 1/2004 | Yegenoglu | 370/252 |

\* cited by examiner

*Primary Examiner*—Daniel J. Ryman
*Assistant Examiner*—Toan Nguyen
(74) *Attorney, Agent, or Firm*—Anderson Gorecki & Manaras LLP (57) ABSTRACT

In a multiple element network, a method and network element for providing a constraint based routing system to accommodate non-transitive exceptions. The method and network element receive a connection request for an end to end connection. The network element can select routing information having a pair of adjacent links associated with the multiple elements of the network, where each link of the pair of links has a shared network resource. The shared network resource is compared to a database of exception sets, the exception sets including at least one non-transitive exception predetermined from a plurality of network resources. The network element confirms whether the shared network resource of the selected pair of links is contained within the exception database. A router designs a pathway over the network for the end to end connection using the results of the shared network resource comparison, wherein inclusion in the pathway is inhibited for the shared network resource matching the predetermined exclusion set contained in the database. Accordingly, the list of exception sets is accessible by a constraint based routing algorithm as input to exclude the selected link pair of a pathway for the end to end connection over the network, if the shared network resource of the link pair is contained within the exception sets.

30 Claims, 7 Drawing Sheets

CONSTRAINT BASED ROUTING WITH NON-TRANSITIVE EXCEPTIONS

FIELD OF THE INVENTION

The present invention relates to multi-hop distributed networks and, in particular, to constraint based routing between network elements.

DESCRIPTION OF THE PRIOR ART

Distributed topologies of todays modern networks are applied in a number of different areas, such as optical telecommunication networks, power grids, and routing networks for vehicular traffic. These distributed topologies are commonly referred to as multi-hop networks, in which transport through the network of a package/message, or packet, is done in a series of hops over a sequence of interconnected network nodes. The network resources are typically shared between a number of competing packets, according to established network protocols.

As todays networks evolve, new capacities and new routes are added to the existing networks. For example, telecommunication networks continually experience new requirements for transmission from increased traffic volume growth and new types of services having different bandwidth. Quality of service and routing constraints can also change network dynamics. There are a number of well known routing algorithms, such as the Dijkstra Shortest Path and the OSPF algorithm, which are currently applied to networks for configuring a pathway between endpoints of a requested connection. These routing algorithms take into account variables such as cost, distance, and available network element resources, to design an optimum pathway for the connection request using selected network nodes.

For example, with telecommunication networks, there exists a class of routing and signalling problems generically known as Constraint Based Routing/Signalling. These telecommunication networks typically consist of a collection of network elements, links between those elements with resource limits, and a control processor (or more) per network element. The constraint based routing/signalling algorithm solves the problem of computing a route for a requested connection through such an arbitrary telecommunication "mesh" network. This route is implemented on a distributed database of network elements associated with the controller at the head end of the connection in question. Normally, Dijkstra's shortest path algorithm is applied to the set of links in the telecommunication network that have sufficient resources to support the connection. Once the pathway is computed by network element and link selection, the pathway is given to a signalling engine for establishment by taking network resources from the selected links the engine traverses. Once the pathway is established, the network resources, as they are taken (or freed), cause a distributed set of routers adjacent to the resources to trigger periodic floods through the network that inform the set of routers of any resource change. This effectively creates a feed back system, which is used by the network to help in continuously setting up and taking down of connections as required, and making available the updated network resources to all network elements in the network.

Typical implementations of constraint based routing/signalling algorithms for telecommunication networks consist of MPLS/GMPLS/PNNI/PORS and numerous other systems. For example, in MPLS and PNNI the network resources are statistically multiplexed bandwidth, which are tracked and flooded by network links. In GMPLS, physical resources are tracked, such as timeslots, wavelengths, fibre ports, or other non-sharable resources. The traditional constraint based routing/signalling algorithms assume that there is no direct relationship of network resources between various respective links in the network. In particular, if resources are available for a requested connection on link A, and also on link B, and link A and B are adjacent, it is assumed that by transitivity that a connection may traverse link A and B sequentially. However, there exist classes of networks where this is not true due to non-transitive constraints, where resource availability between adjacent network elements is discontinuous.

A first class of telecommunication network which exhibits non-transitive allocation restrictions for network resources is a pure photonic network. The analog nature of photonic transport causes non-linear behaviours to accumulate as the pathway length/distance grows. For example, a signal can be sent and received unambiguously over link A of some distance D1, as well as sent and received unambiguously over link B for some distance D2. However, this does not mean the signal can be sent over links A and B, over distance D1+D2, and still be received unambiguously. It is understood there are numerous other attributes of photonic transport besides distance that will gang up to create these non-transitive problems, such as but not limited to time slot availability, laser intensity, wavelength, and dispersion characteristics.

A second class of telecommunications network which exhibits non-transitive allocation restrictions is the classic ring network. Examples of which (but not limited to) are BLSR SONET rings, which can be thought of as a subclass of mesh networks. However, implementation of traditional constraint based routing is problematic with ring network segments because segment to segment constraints (such as lack of timeslot interchange) are not, and cannot, easily be reflected in network topology since the constraints grow $O(n^2)$ as the intended routing extends along the ring segment. One disadvantage with ring network routing is that the requested connection is usually restricted to using the same TDM time slot on all hops around that ring. In other words, if resource r is used on link A, resource r must also be used on link B (if link A and B are on the same ring). This creates a non-transitive resource relationship between links on common rings, and hence presents difficult challenges to solve efficiently by normal constraint based routing and signalling algorithms.

It is an object of the present invention to provide a constraint based routing system to obviate or mitigate some of the above-presented disadvantages.

SUMMARY OF THE INVENTION

There exist classes of networks where, due to non-transitive constraints, resource availability between adjacent network elements is discontinuous. According to the present invention there is provided in a multiple element network, a method for providing a constraint based routing system to accommodate non-transitive exceptions. The method comprises the steps of: receiving a connection request for an end to end connection; selecting routing information having a pair of adjacent links associated with the multiple elements of the network, each link of the pair of links having a shared network resource; comparing the shared network resource to a database of exception sets, the exception sets including at least one non-transitive exception predetermined from a plurality of network resources; confirming whether the shared network resource of the selected pair of links is contained within the database; and designing a pathway over the network for the end to end connection using the results of the shared network resource comparison; wherein inclusion in the pathway is inhibited for the shared network resource matching the predetermined exclusion set contained in the database.

According to a further aspect of the present invention there is provided in a multiple element network, a network element for providing a constraint based routing system to accommodate non-transitive exceptions. The network element comprises: a first link for connecting the network element to a path layer of the network, the path layer including a plurality of additional network elements with associated network links, the network links having at least a pair of adjacent links having a shared network resource; a topology database including a list of exception sets including a plurality of non-transitive exceptions predetermined from a plurality of network resources of the network links, the topology database accessible by the network element; and a compiler accessible by the network element for assembling exception set data to store in the topology database; wherein the list of exception sets is accessible by a constraint based routing algorithm as input to exclude the selected link pair of a pathway for an end to end connection over the network, if the shared network resource of the link pair is contained within the exception sets.

According to a still further aspect of the present invention there is provided in a multiple element network a computer program product for providing a constraint based routing system to accommodate non-transitive exceptions. The product comprises: computer readable medium; a first link module stored on the computer readable medium for connecting the network element to a path layer of the network, the path layer including a plurality of additional network elements with associated network links, the network links having at least a pair of adjacent links having a shared network resource; topology database module stored on the computer readable medium including a list of exception sets including a plurality of non-transitive exceptions predetermined from a plurality of network resources of the network links, the topology database module accessible by the network element; and a compiler module coupled to the topology module and accessible by the network element for assembling exception set data to store in the topology database; wherein the list of exception sets is accessible by a constraint based routing algorithm as input to exclude the selected link pair of a pathway for an end to end connection over the network, if the shared network resource of the link pair is contained within the exception sets.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
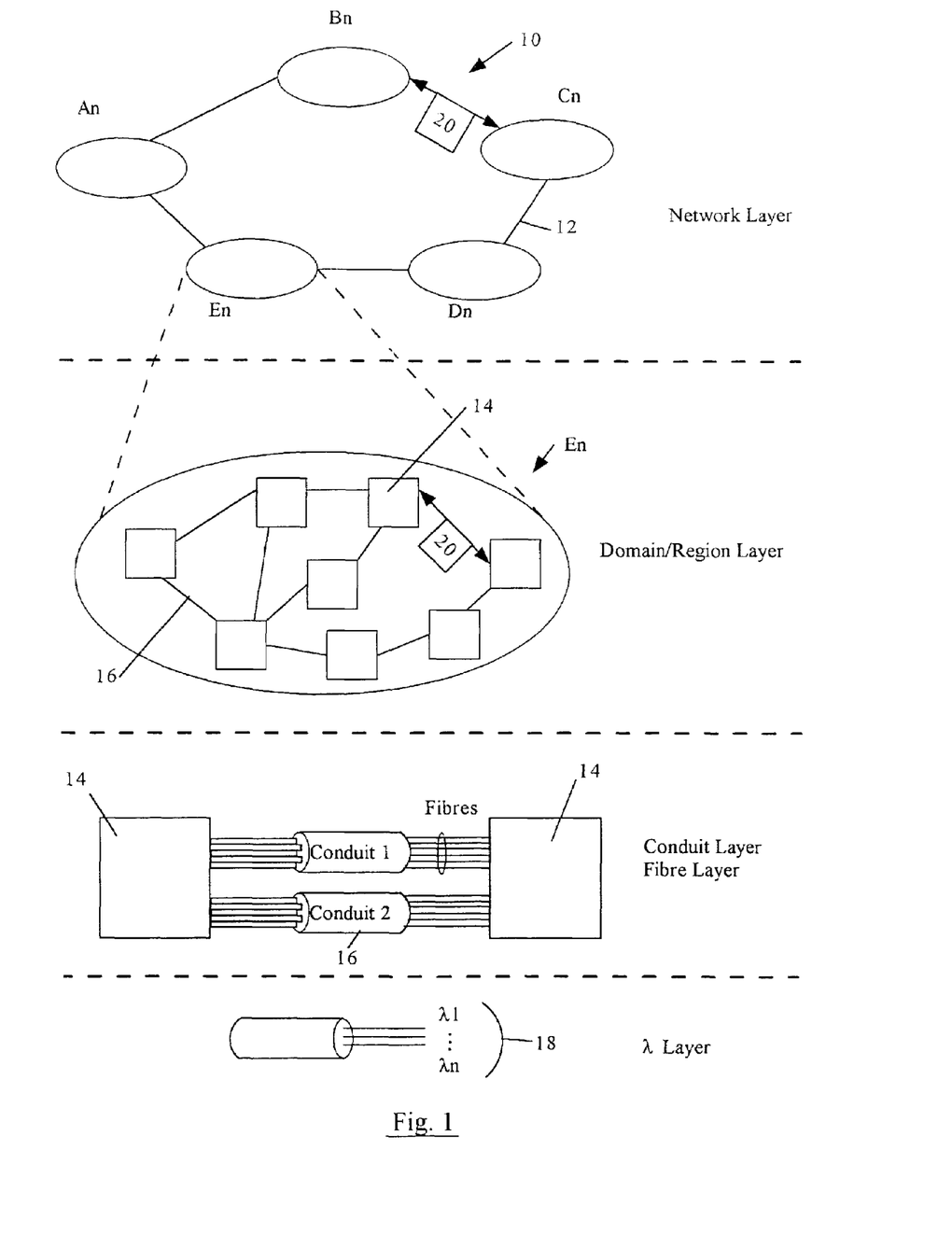
FIG. 1 is a diagram of a data communication network.

Referring to FIG. 1, one example of a distributed network is a global telecommunication network 10, which contains a series of sub-networks An, Bn, Cn, Dn, En interconnected by bulk data transmission mediums 12. These mediums 12 can consist of such as but not limited to optical fibre, wireless, and copper lines, which can be collectively referred to as a Backbone Network. Each sub-network An, Bn, Cn, Dn, En contains a plurality of network elements 14 interconnected by conduits or links 16, which can be collectively referred to as a path layer 17 (see FIG. 2). These links 16 can consist of fibre optic cables, DSL (Digital Subscriber Loop), cable, and wireless mediums, wherein each link 16 can be capable of providing the transmission of multiple wavelengths 18 as required by the telecommunication network 10. The telecommunication network 10 can be referred to as a "multi-hop network", in which transport of the majority of data packets 20 from one network element 14 to another takes multiple "hops" (i.e. node to node transmission), such that the data packets 20 traverse the network 10 across multiple adjacent links 16. The traffic routing capabilities of the telecommunication network 10 can be used by a variety of different carriers, such as ILECs, CLECs, ISPs, and other large enterprises to monitor and transmit a diverse mixture of data packets 20 in various formats. These formats can include voice, video, and data content transferred over individual SONET, SDH, IP, WDN, ATM, and Ethernet networks associated with the telecommunication network 10. It is recognised that traffic routing can also be used on network types other than the telecommunication network 10 shown, such as but not limited to power grids, and vehicular traffic routing.

Figure 2:
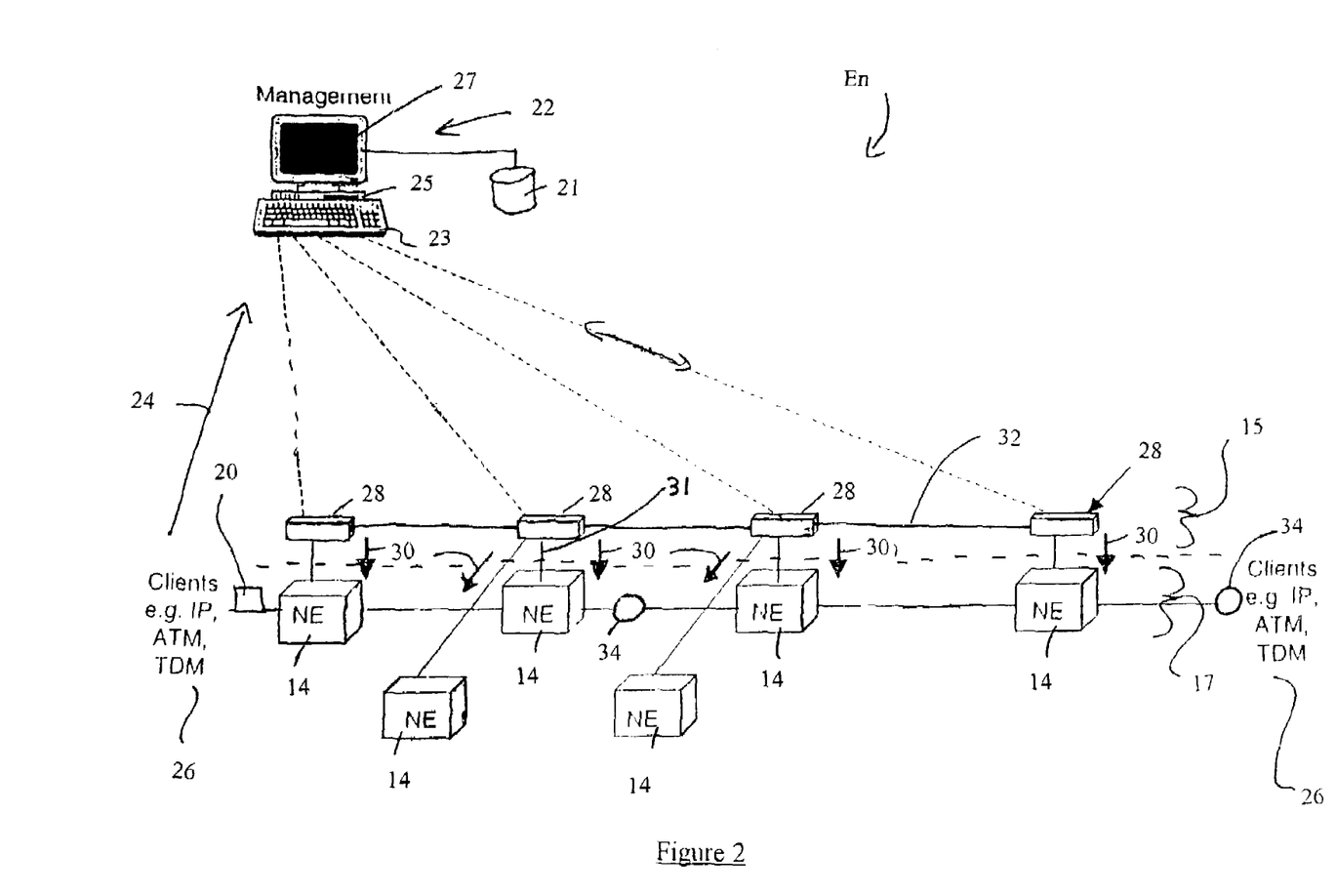
FIG. 2 is a sub-network of the network of FIG. 1.

Referring to FIG. 2, operation of each network element 14 can be monitored by a central integrated management or Operations Support System (OSS) 22, which for example co-ordinates a plurality of connection requests 24 received from clients 26 connected to the sub-network En. Alternatively, these connection requests 24 can also be communicated directly to any of a series of corresponding Optical Connection Controllers (OCCs) 28, which make up a control layer 15 of the network 10. The network 10 also contains a distributed series of routers 34 (a particular type of network element 14), which are responsible for allocating the available network 10 resources for each connection request 24. Traditionally, the OCCs 28 communicate endpoints (head and tail) of the connection requests 24 to the routers 34, which then design working W and protection P pathways (see FIG. 3) for the connection request 24, using selected routing algorithms. This pathway information is then given to a signalling engine 36 of the head end of the established connections, such as to network element 1 of connection A-B and network element 6 of connection D-C in FIG. 3. The signalling engine 36 then constructs the designed pathways. It is also considered that the OCCs 28 and the OSS 22 could also interact with the routers 34 and signalling engine 36, if desired.

Referring again to FIG. 2, the OSS 24 can include a processor 25. The processor 25 is coupled to a display 27 and to user input devices 23, such as a keyboard, mouse, or other suitable devices. If the display 27 is touch sensitive, then the display 27 itself can be employed as the user input device 23. A computer readable storage medium 21 is coupled to the processor 25 for providing instructions to the processor 25 to instruct and/or configure the various OCCs 28, routers 34, and other corresponding coupled network elements 14, to perform steps related to the operation of a constraint based routing algorithm for implementing the connection requests 24 over the subnetwork En. The computer readable medium 21 can include hardware and/or software such as, by way of example only, magnetic disks, magnetic tape, optically readable medium such as CD ROM's, and semi-conductor memory such as PCMCIA cards. In each case, the medium 21 may take the form of a portable item such as a small disk, floppy diskette, cassette, or it may take the form of a relatively large or immobile item such as hard disk drive, solid state memory card, or RAM provided in the OSS 22. It should be noted that the above listed example mediums 21 can be used either alone or in combination. Accordingly, the constraint based routing algorithm, as further defined below, can be implemented on the sub-network En in regard to the co-ordination of the plurality of connection requirements 24 submitted by the clients 26, as well as monitoring the timely transmission of the associated data packets 20.

The clients 26 or other peripheral devices can include such as but not limited to hubs, leased lines, IP, ATM, TDM, PBX, and Framed Relay PVC, which can be connected to the sub-network En by routers 34. The OCCs 28 are coupled to each network element 14 by link 31, which transmits connection and data request 30 to each of their corresponding network elements 14. The association of OCCs 28 can be referred to as the control layer 15, with each OCC 28 coupled together by links 32. The OCCs 28 of the control layer 15 have complete information of their corresponding network element 14 interconnections and status identified by the routers 34.

Figure 3:
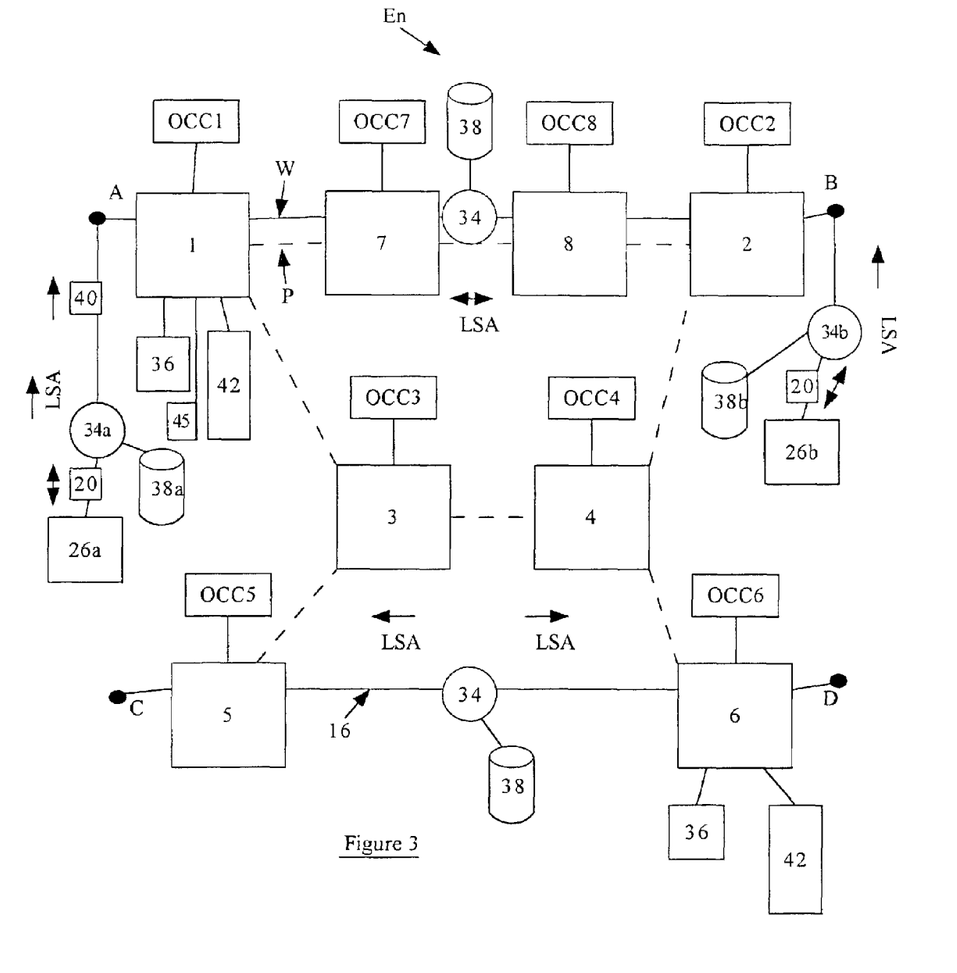
FIG. 3 shows a connection set-up for the sub-network of FIG. 2.

Referring to FIG. 3, there is depicted a simplified shared mesh network En structure for clarity purposes only. The shared path protection set-up of the sub-network E consists of a series of network elements 14 indicated as 1, 2, 3, 4, 5, 6, 7, 8 with a corresponding number of OCC's 28 indicated as OCC 1, OCC 2, OCC 3, OCC 4, OCC 5, OCC 6, OCC 7, and OCC 8. The elements 1, 2, 3, 4, 5, 6, 7, 8 are interconnected by the links 16, logical and/or physical, with solid line paths A-B and C-D denoting working W paths and the dotted line paths 1-3-4-2, 5-3-4-6, and 1-7-8-2 between the elements 1, 2, 3, 4, 5, 6, 7, 8 denoting potential protection P paths. The term "working" refers to the routes and equipment involved in carrying STS-1 frames on the sub-network En during the normal mode of operation, and the term "protection" refers to the routes and equipment involved in carrying the STS-1 frames on the sub-network En during a failure mode of operation.

Referring to FIG. 3, the routers 34 are responsible for routing the information packets 20 between the clients 26 through sub-network En. For example, the constraint based routing algorithm such as Open Shortest Path First (OSPF), can be used by the routers 34 to define the working W and protection P pathways. The operation of the OSPF algorithm depends on link-state databases 38 that are maintained by each router 34 in the sub-network En for calculating the shortest available pathways between the endpoints of each connection A-B, C-D. Such link-state databases 38 are continually updated by having each router 34 originate one or more Link State Advertisements (LSA) for use as link-state database 38 entries containing information about each link 16 connected to the router 34. The LSA is a block of data produced by each router 34 specifying such as but not limited to the state of each link 16 attached to the router 34, as well as link and router identifiers and details for shortest path calculations. All routers 34 in the sub-network En collect the LSAs, check them, and use the link-state data from valid LSAs to build identical link-state databases 38. Accordingly, if one of the routers 34 fails, the remaining routers 34 can then route the failed router's 34 packets 20 using their updated link-state databases 38 and coordinate any further routing resulting from the failed router's 34 connection requests 24.

For example, referring to FIG. 3, the link-state databases 38 of every router 34 can be updated every 30 minutes by each of the routers 34 independently flooding the sub-network En with LSAs, whereby every half hour each router 34 produces a fresh LSA. It is noted that each router 34 sends over adjacent links 16 the LSA it prepared as well as any LSAs received from the area network that are attached to the router 34. LSAs may also be sent on per-need basis, for example, when a new link 16 or a router 34 is connected to the sub-network En. Further, new LSAs can also be sent by the routers 34 when the previous LSAs become too old, that is, as LSAs get routed their age is increased by an aging algorithm.

Using the link-state database 38 information, the constraint based routing algorithm of the routers 34 designs the pathways W,P for the connection request 24. Once determined, routing information 40 on the designed pathways W,P is communicated by the router 34 to the signaling engine 36, of the head end of the connection A-B, C-D, that will be responsible for implementing the connection request 24. For example, referring to FIG. 3, client 26a has made the connection request 24 to communicate data packets 20 to client 26b. The router 34a receives details of the connection request 24 and proceeds to design the connection A-B (typically both the working W and protection P pathways) from the network resources of the network elements 1,7,8,2 (for the working W path), network elements 1,3,4,2 (for the protection P path), and their adjacent links 16. The pathway routing information 40 is then given to the signaling engine 36 of the network element 1, which then establishes the designed pathways W,P by allocating the network resources from the selected links 16 and network elements 14 the signalling engine 36 traverses. Once the pathways W,P are established, the data packets 20 are communicated between the clients 26a,b.

Figure 4:
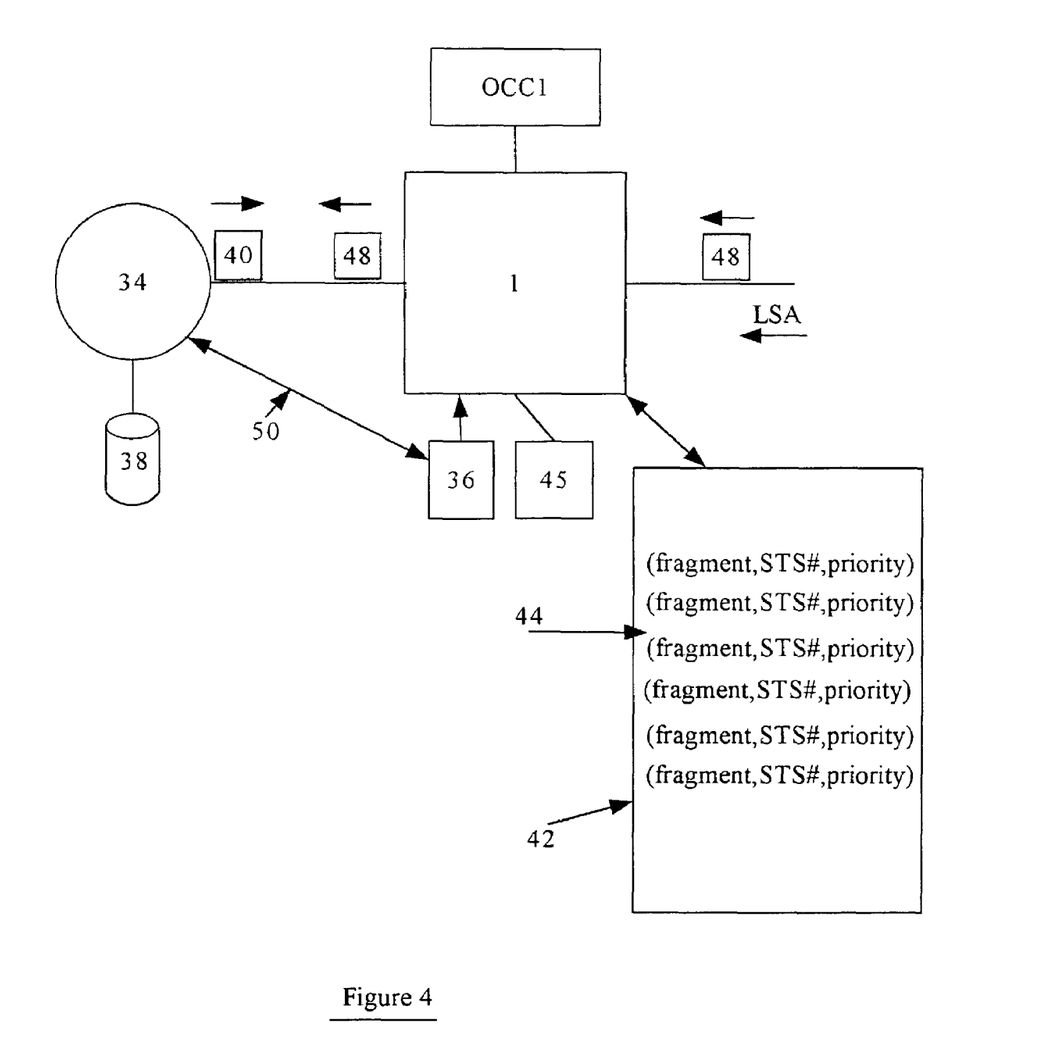
FIG. 4 shows a topology database for the sub-network of FIG. 3.

Referring to FIGS. 3 and 4, each head end network element 1 can have access to a topology database 42, which contains any predetermined exception sets 44. The exception sets 44 can consist of network resource lists, such as but not limited to path-fragment, size of STS, and priority that cannot be accommodated when accessed by the signaling engine 36. Other network resources for inclusion in the exception sets could be statistically multiplexed**** bandwidth, timeslots, wavelengths, fibre ports, and other shared physical and logical resources. The exception sets 44 are a result of the construction and feedback of link sequences, which exhibit non-transitive behaviours for resource requests made by the signalling engine 36. For example, the exception sets 44 are revealed to the network element 1 when the signalling engine 36 attempts to set-up the connection A-B based on the routing information 40, but is unable to complete the set-up. This routing signal failure can be due to the underlying resource management modules, of the associated network elements 14 in the chosen pathways W,P, which detect an incompatibility between the preceding network element 14/link 16** resource allocation and the next available resource in sequence along the designed pathway W,P.

When this network resource incompatibility is detected, the network element 14 concerned creates the exception set 44, which consists of a set of hops which will not work for the routing information 40 as specified. The exception set 44 is then transported back to the head end network element 1 through feedback signals 46 by adding to, such as but not limited to a reverse flowing failure message, an exception LSA, a tear message, flooding, or any other means sufficient to communicate the incompatibility. The head end network element 1 maintains in the topology database 42 through a compiler 45 the exception sets 44, which are avoided in subsequent pathway W,P design and set-up. Accordingly, any subsequent routing information 40 generated by the routers 34 excludes any of the excepted sequences in the exception sets 44, at the indicated priority, for STS sizes greater than or equal to what is being excluded. It is noted that the head end network element 1 of the requested connection A-B will accumulate these exception sets 44 through the compiler 45 in the topology database 42, however, the associated OCC1 and/or the OSS 22 can also have access to and maintain the topology databases 42, if desired. It is recognised that the router 34 and/or the OCCs 28 and the OSS 22 could have access to the compiler 45, if desired.

Some implementations of the exception set 44 content in the topology databases 42 may choose to hold the exception sets 44 for short periods of time. Others may choose to remove the exception sets 44 when floods are received by the head end network element 1, which indicate newly available links 16/network elements 14 contained in the original exception sets 44. For example, if the head end network element 1 receives new LSAs noting an increase in network resources (such as but not limited to bandwidth), any exception sets 44 containing path fragments associated with the increased network resources are removed. This can facilitate the potential that any change in network resources will now allow use of at least a portion of the now freed-up exception set 44. Should this not be the case, subsequent exception sets 44 will be encountered by the signalling engine 36 and written into the topology database 42.

This removal of exception sets 44 can also be done when notification of a reallocation of network resources is received by the network element 1, such that the reallocation does not result in an increase in the network resources (e.g. total available bandwidth remains constant but available channels has changed). For example, when time slot #1 becomes available but time slot #4 is taken, which can be a neutral network resource change with respect to LSAs but should be considered for exception set 44 removal. Further, exception sets 44 can also be collapsed. For example, if there is an initial STS-1 exception on a specified path fragment and then a subsequent STS-3 exception occurs, the STS-1 exception can be collapsed into the STS-3 by modifying the exception sets 44 in the topology database 42.

Predefined removal/amendment criteria can be set-up by a network administrator or the OSS 22 to note the conditions for periodic removal and/or amendment of the exception sets 44, such as but not limited to aging of exception sets 44. In any event, any exception sets 44 prematurely removed may be reencountered by the signalling engine 36 and rewritten back into the topology database 42. Accordingly, the predefined criteria can be optimised for various network 10 types and traffic conditions.

Accordingly, the constraint based routing algorithm used by the routers 34, such as but not limited to OSPF, MOSPF, and Dijkstra, is modified to take into account the exception set 44 data contained in any topology databases 42 pertaining to the connection request 24. For example, when the modified constraint based routing algorithm of the router 34 accesses its link-state database 38 information, the algorithm also has access (by a direct or indirect link 50) to the exclusion sets 44 stored in the topology database 42 associated with the head end network element 1 of the connection A-B in question. Therefore, the algorithm is able to recognise when it is about to use one of the network elements 14 that has an exception set 44 associated with it, and then not consider this now excepted network element 14 if the other members of the same exception set 44 are currently in the pathway W,P designed thus far. In the event that initial set-up by the signalling engine 36 of the designed pathway W,P fails, the head end network element 1 first includes the newly determined exception set 44 in its topology database 42 before requesting for a new route selection 48 from the router 34. Therefore, the modified constraint based routing algorithm operates to transform the sub-network En topology in such a way as to inhibit the routing information 40 containing a sequence or subsequence of hops that matches any of the exception sets 44 learned thus far and stored in the topology database 42. It is further recognised that the router 34, OSS 22, and OCCn may also have the ability to modify the contents of the topology databases 42.

Figure 5:
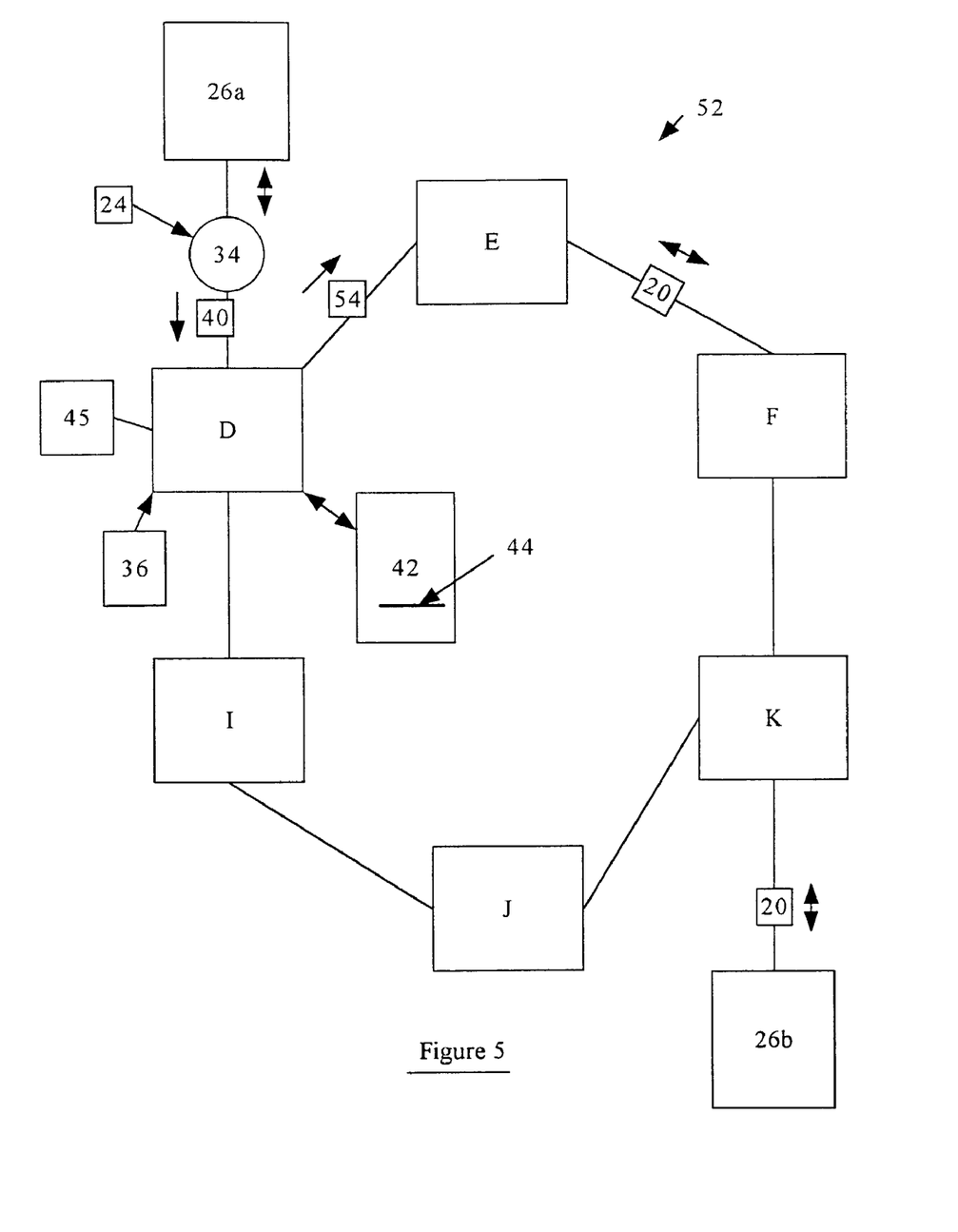
FIG. 5 is an alternative embodiment of the sub-network of FIG. 3.
Figure 6:
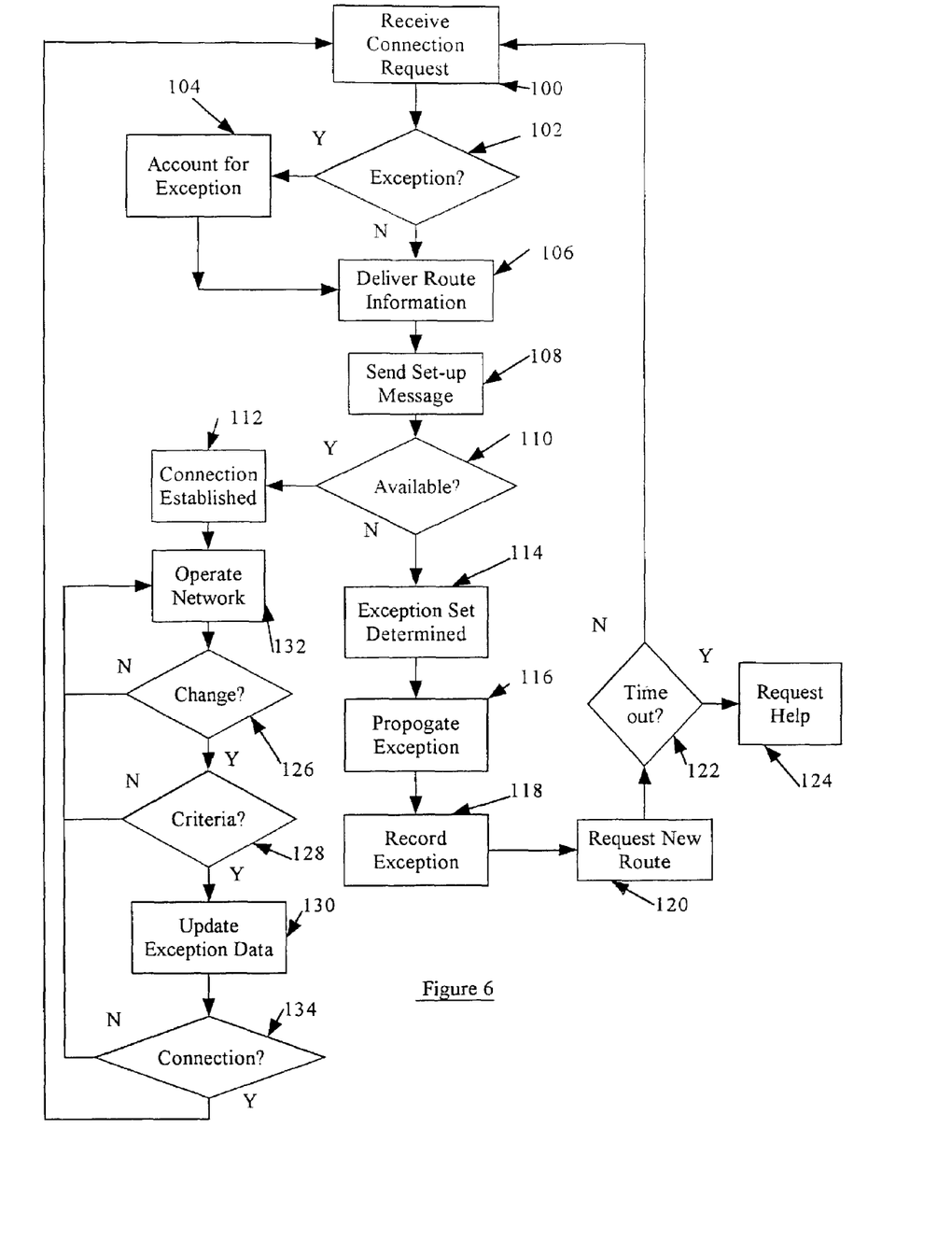
FIG. 6 is an flowchart for the operation of the routing algorithm.

Referring to FIGS. 5 and 6, an example operation of the modified constraint based routing algorithm is applied to a ring type sub-network 52, which has an entry point, network element D, and an exit point, network element K. Accordingly, all other network elements E,F,I,J are considered pass through nodes for any requested connections between network elements D and K around the sub-network 52. Initially, the router 34 receives the connection request 24 from client 26a and proceeds to compute 100 the connection 26a-26b, with the modified constraint based routing algorithm, using a path fragment {D,E,F,K} on the ring network 52. The router 34 checks 102 the topology database 42 (directly, or indirectly through requesting the network element D) for any exception sets 44 pertaining to the path fragment. If exceptions sets 44 are present, then the router 34 accounts 104 for them in the designed pathway and delivers 106 the routing information 40 to the entry point, network element D. Otherwise, the router 34 delivers the routing information 40 to the network element D without noting any exceptions.

For explanation purposes, it is assumed that no exception sets 44 were noted by the router 34. Accordingly, the signalling engine 36 of the network element D then sends 108 a set-up message 54 with a hop list containing the path fragment {D,E,F,K} towards network element K, the exit point, with such as but not limited to timeslot STS-1 with priority=4. In the event the network resources (in this case STS-1 and priority=4) are available 110 to complete the connection request 24, the signalling engine 36 receives confirmation of the established 112 connection D-K and the network resources allocated thereto as is known in the art. For example, the set-up message arrived at network element D and an available timeslot set (STS-1, pri=4) was added to the set-up message 54. Subsequent arrival of the set-up message at the next hops, network elements E, F, and K, resulted in successful intersection of the timeslot set with subsequently available timeslots (i.e {STS-1, pri=4} is ok for path D-E-F-K) and an updated timeslot set for further propagation. Transmission of data packets 20 can then proceed 132 over the established connection D-K, as shown in FIG. 5.

Figure 7:
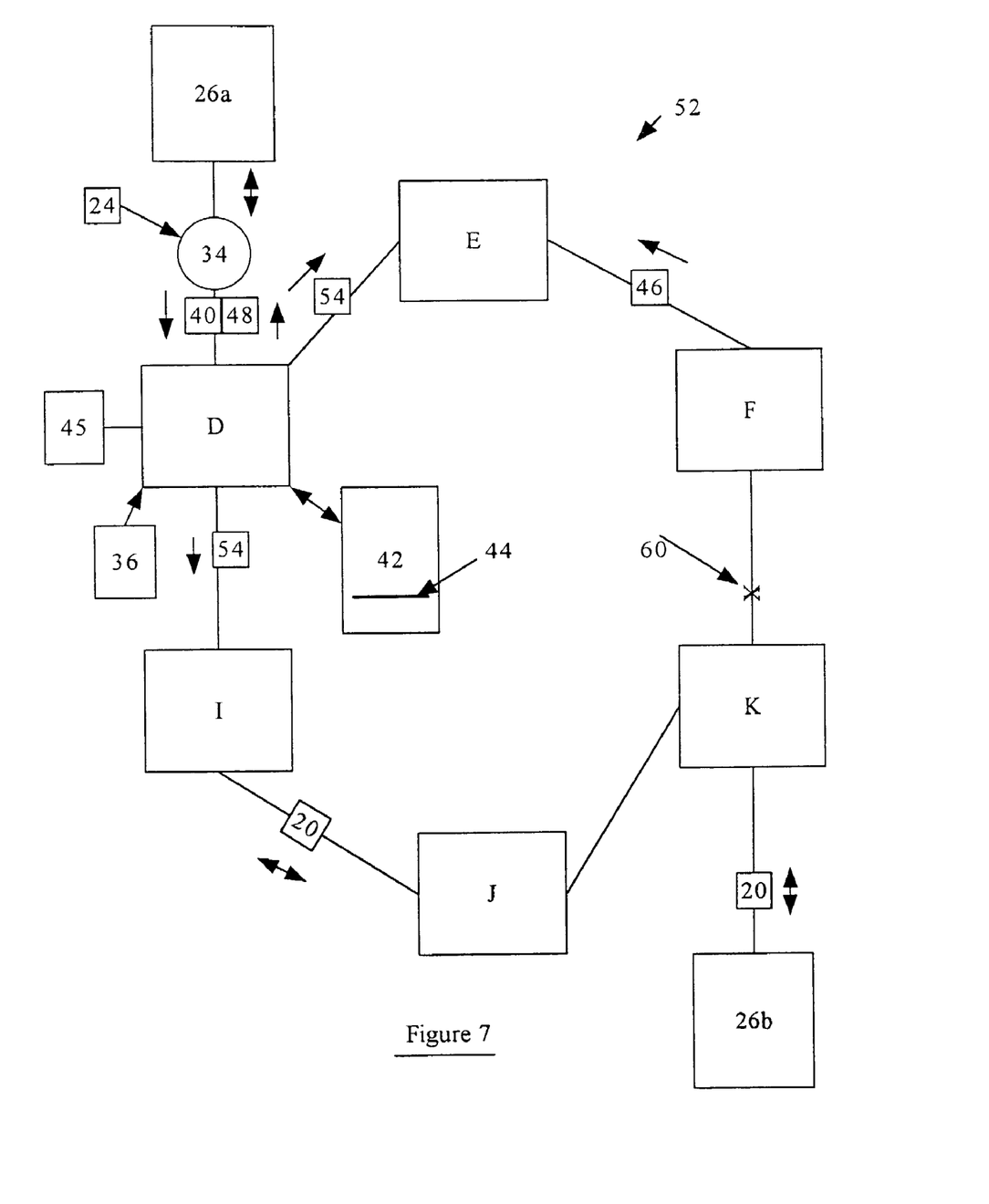
FIG. 7 is an alternative embodiment of the sub-network of FIG. 5.

However, referring to FIGS. 6 and 7, a non-transitive exception 60 is encountered at step 110. For example, when the timeslot set collected up to network element F is propagated by the set-up message 54 to network element K, the timeslot set intersection produces an empty set (i.e. {D,STS-1,pri=4} {E,STS-1,pri=4} {F,STS-1,pri=4} {K,STS-1,pri=4}=Ø). The empty set Ø indicates the first encountered portion of the exception set 44 (i.e. unknown, K, STS-1, pri=4). Accordingly, the feedback signal 46 (such as a tear down message) builds 114 the exception set 44 as a feedback vector, which is eventually propagated 116 back to the ring network 52 entry point, network element D. During building of the feedback vector, the path fragment component E,F, the exit point K, the entry point D, and the type/priority are collected in the feedback message 46 eventually as the new exception set 44 {D,E,F,K, STS-1,pri=4}.

Accordingly, the head end network element D now records 118 through the compiler 45 the exception set 44 in the topology database 42 as part of the failed set-up. The head end network element D then requests 120 a new route selection 48 from the router 34 starting back at step 100. For example, a new route computation starts again with network element D, but now does not include 102 the {STS-1,pri=4} condition in the network element K direction, as present in the topology database 42. Therefore, as the considered path set collected by the router 34 grows, it will still include D even though D has an exception associated with it, but only if K is not yet part of the set of network elements 14 with D required to complete the pathway on the {STS-1,pri=4} designation. In situations where the pathway computation by the router 34 is about to consider K, the router 34 notes in the exception set 44 of K in combination with the other network elements 14, and therefore excludes 104 all pathways satisfying the exception set 44. Therefore, the modified constraint based routing algorithm, noting non-transitive exceptions, of the router 34 could consider network elements 14 adjacent to F, E, or D, which could lead to the alternative D,I,J,K route information 40 delivered 106 to the head end network element D. The rest of the connection set-up procedure would continue from step 108 as described above. It is recognised a time out 122 procedure could be used, in the event that the requested connection cannot be completed. At this stage, the OCCs 28 of the control layer 15 (see FIG. 2) could be consulted 124 for further instructions.

Further, as the network 10 is operated 132, the head end network element D is continually polling 126 for, or receiving, updates to the network resources of the ring network 52. In the event parameters of a resource change 128 satisfies the predefined criteria, any affected exception sets 44 are removed 130 from the topology database 42. For instance, in the above ring network 52 example, an LSA received by the head end network element D could indicate growth or change in the status of timeslots on the network element E,F path fragment, which could result in the removal of all exception sets 44 from the topology database 42 having the (E,F) designation in their exclusion sub-path. This removal would allow rerouting over the D,E,F,K path fragment for all timeslots. It is also noted also that the topology database 42 can be populated with exception sets 44 by testing the result of the path computations against network simulators, rather than actually setting up and testing the path or sub paths by the signalling engine 36. It is also recognised that the topology database 42 could be updated to reflect the complete failure of certain network elements 14 and links 16, or other such failures simultaneously affecting large blocks of network resources. These network failures could be communicated by the LSAs or any other failure indication method for use by the head end network element D. Accordingly, the head end network element 1 and/or the associated router 34 acknowledges whether any further connection requests are received 134 for set-up of the connection starting at step 100, as described above.

It is recognised that a unit of allocation for the non-transitive allocation restrictions can be represented by a generalised label, such as but not limited to a GMPLS label that covers time/space and frequency switching. The use of labels can be applied to such as but not limited to the communication of transport routing information 40, set-up message 54, and feedback signals 46. It is recognised that the label can include implicit values defined by a particular link 16 medium that is being provisioned, for example a wavelength for a DWDM system or a timeslot for a SONET device. This enables label switched paths (LSPs) of the network 10 to pass through different types of label switch routers (LSRs) 34, for example SONET ADMs and Optical Cross Connects (OXCs).

Basic attributes of labels are as follows; forwarding information (label) is separate from a content of an IP header, the ability of using a single forwarding paradigm (label swapping), multiple routing paradigms, multiple link-specific realizations of the label swapping forwarding paradigm: "shim," virtual connection/path identifier (VCI/VPI), frequency slot (wavelength) and time slot, and the flexibility to form forwarding equivalence classes (FECs). The generalized label contains information to allow the receiving device to program its switch and forward data regardless of its construction (packet, TDM, lambda, etc.). A generalized label can represent a single wavelength, a single fiber, or a single time-slot. Traditional MPLS labels—e.g., ATM, VCC, or IP shim—are also included. The information that is embedded in a generalized label includes the following: LSP encoding type that indicates what type of label is being carried (e.g., packet, lambda, SONET, etc.); switching type that indicates whether the node is capable of switching packets, time-slot, wavelength, or fiber; a general payload identifier to indicates what payload is being carried by the LSP (e.g., virtual tributary [VT], DS-3, ATM, Ethernet, etc.).

In operation of the network 10 using labels for the transport routing information 40, set-up message 54, and feedback signals 46, separation of forwarding information from the content of the IP header allows use with devices such as OXCs, whose data plane cannot recognize the IP header. Label switch routers (LSRs) 34 forward data using the label carried by the data. This label, combined with the port on which the data was received, is used to determine the output port and outgoing label for the data. For example, a wavelength could be viewed as an implicit label. The concept of a forwarding hierarchy via label stacking enables interaction with devices that can support only a small label space.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. In a multiple element network, a method for providing a constraint based routing system to accommodate non-transitive exceptions, the method comprising the steps of:
   a) receiving a connection request for an end to end connection;
   b) selecting routing information having a pair of adjacent links associated with the multiple elements of the network, each link of the pair of links having a shared network resource;

c) comparing the shared network resource to a database of exception sets, the exception sets including at least one non-transitive exception predetermined from a plurality of network resources, a non-transitive exception being where both a first and a second resource are adequate when considered alone, but the combination of the first and second resources is inadequate;

d) confirming whether the shared network resource of the selected pair of links is contained within the database; and e) designing a pathway over the network for the end to end connection using the results of the shared network resource comparison;

wherein inclusion in the pathway is inhibited for the shared network resource matching the predetermined exclusion set contained in the database.

2. The method according to claim 1 further comprising the step of providing the designed pathway to a signalling engine for establishing the pathway.

3. The method according to claim 2 further comprising the step of receiving a feedback signal indicating a new exception has been encountered when establishing the pathway by the signaling engine.

4. The method according to claim 3, wherein the feedback signal is selected from the group comprising; a reverse flowing failure message, a link state advertisement, and a tear message.

5. The method according to claim 3, wherein the feedback signal includes a feedback vector indicating a path fragment including the excepted network resource.

6. The method according to claim 5, wherein the path fragment includes an entry point and an exit point of the network for the requested end to end connection.

7. The method according to claim 5, wherein the shared network resources are selected from the group comprising; size of STS, priority, multiplexed bandwidth, a timeslot, and a fibre port.

8. The method according to claim 3 further comprising the step of requesting a new pathway not including the new exception.

9. The method according to claim 3 further comprising the step of storing a new exception set in the database corresponding to the new exception.

10. The method according to claim 1, wherein the shared network resource is selected from the group comprising; size of STS, priority, multiplexed bandwidth, a timeslot, and a fibre port.

11. The method according to claim 1 further comprising the step of receiving a message indicating a resource change in the plurality of network resources.

12. The method according to claim 11 further comprising the step of comparing a parameter of the resource change with predefined criteria to determine if the resource change affects any of the exclusion sets in the database.

13. The method according to claim 12 further comprising the step of removing at least one of the exception sets from the database containing the resource change.

14. The method according to claim 13, wherein removal of the affected exception set permits reallocation of associated links for designing the pathway related to subsequent connection requests.

15. The method according to claim 13, wherein periodic removal of the exception sets from the database is performed according to predefined removal criteria.

16. The method according to claim 11, wherein periodic amendment of the exception sets from the database is performed according to predefined amendment criteria.

17. The method according to claim 1 further comprising the step of populating the database with predetermined exception sets provided from pathway computations of a network simulator.

18. In a multiple element network, a network element for providing a constraint based routing system to accommodate non-transitive exceptions, the network element comprising:

a) a first link for connecting the network element to a path layer of the network, the path layer including a plurality of additional network elements with associated network links, the network links having at least a pair of adjacent links having a shared network resource;

b) a topology database including a list of exception sets including a plurality of non-transitive exceptions predetermined from a plurality of network resources of the network links, the topology database accessible by the network element, a non-transitive exception being where both a first and a second resource are adequate when considered alone, but the combination of the first and second resources is inadequate; and c) a compiler accessible by the network element for assembling exception set data to store in the topology database;

wherein the list of exception sets is accessible by a constraint based routing algorithm as input to exclude the selected link pair of a pathway for an end to end connection over the network, if the shared network resource of the link pair is contained within the exception sets.

19. The network element according to claim 18, wherein the network element is a head end of the end to end connection.

20. The network element according to claim 19 further comprising a signalling engine for providing the exception set data in the form of a feedback signal to the compiler.

21. The network element according to claim 19, wherein the feedback signal is selected from the group comprising; a reverse flowing failure message, a link state advertisement, and a tear message.

22. The network element according to claim 19, wherein the feedback signal includes a feedback vector indicating a path fragment including the excepted network resource.

23. The network element according to claim 22, wherein the path fragment includes an entry point and an exit point of the network for the requested end to end connection.

24. The network element according to claim 22, wherein the shared network resource is selected from the group comprising; size of STS, priority, multiplexed bandwidth, a timeslot, and a fibre port.

25. The network element according to claim 18, wherein the network element is a router of the end to end connection.

26. The network element according to claim 25 further comprising a link state database accessible by the router, the link state database providing status on the plurality of network resources of the network links.

27. The network element according to claim 26, wherein the router compares the status of the links from the link state database with the exception set of the topology database for confirm whether the links of the determined pathway contain a predetermined exception.

28. In a multiple element network, computer program product for providing a constraint based routing system to accommodate non-transitive exceptions, the product comprising:

a) computer readable medium;

b) a first link module stored on the computer readable medium for connecting the network element to a path layer of the network, the path layer including a plurality of additional network elements with associated network links, the network links having at least a pair of adjacent links having a shared network resource;

c) topology database module stored on the computer readable medium including a list of exception sets including a plurality of non-transitive exceptions predetermined from a plurality of network resources of the network links, the topology database module accessible by the network element, a non-transitive exception being where both a first and a second resource are adequate when considered alone, but the combination of the first and second resources is inadequate; and d) a compiler module coupled to the topology module and accessible by the network element for assembling exception set data to store in the topology database;

wherein the list of exception sets is accessible by a constraint based routing algorithm as input to exclude the selected link pair of a pathway for an end to end connection over the network, if the shared network resource of the link pair is contained within the exception sets.

29. In a multiple element network, a network element for providing a constraint based routing system to accommodate non-transitive exceptions, the network element comprising:

a) a means for connecting the network element to a path layer of the network, the path layer including a plurality of additional network elements with associated network links, the network links having at least a pair of adjacent links having a shared network resource;

b) a database means including a plurality of non-transitive exceptions predetermined from a plurality of network resources of the network links, the database means accessible by the network element, a non-transitive exception being where both a first and a second resource are adequate when considered alone, but the combination of the first and second resources is inadequate; and c) a compiler means accessible by the network element for assembling exception set data to store in the database means;

wherein the list of exception sets is accessible by a constraint based routing algorithm as input to exclude the selected link pair of a pathway for an end to end connection over the network, if the shared network resource of the link pair is contained within the exception sets.

30. In a multiple element network, a method for providing a constraint based routing system to accommodate non-transitive exceptions, the method comprising:

a) step for receiving a connection request;

b) step for selecting routing information associated with the multiple elements of the network, each link of a pair of links having a shared network resource;

c) step for comparing the shared network resource to a database of exception sets including at least one non-transitive exception, a non-transitive exception being where both a first and a second resource are adequate when considered alone, but the combination of the first and second resources is inadequate;

d) step for confirming whether the shared network resource of the selected pair of links is contained within the database; and e) step for designing a pathway over the network using the results of the shared network resource comparison;

wherein inclusion in the pathway is inhibited for the shared network resource matching the predetermined exclusion set contained in the database.

* * * * *

UNITED STATES PATENT AND TRADEMARK OFFICE
CERTIFICATE OF CORRECTION

PATENT NO. : 7,376,086 B1 Page 1 of 1
APPLICATION NO. : 10/241423
DATED : May 20, 2008
INVENTOR(S) : Paraschiv et al.

It is certified that error appears in the above-identified patent and that said Letters Patent is hereby corrected as shown below:

On the title page, item [75] should read:

(75) Inventors: Antonela Paraschiv, Burlington, MA (US);
Sandy Pavel, Ontario (CA);
Peter Ashwood Smith, Quebec (CA);
Darek Skalecki, Ontario (CA).

Signed and Sealed this

Twenty-sixth Day of August, 2008

JON W. DUDAS
*Director of the United States Patent and Trademark Office*